United States Patent [19]

Labrador

[11] Patent Number: 5,027,735
[45] Date of Patent: Jul. 2, 1991

[54] KASIPAGAN SAIL BOAT

[76] Inventor: Gaudencio A. Labrador, 1312 Leaf Ter., San Diego, Calif. 92114

[21] Appl. No.: 472,753

[22] Filed: Jan. 31, 1990

Related U.S. Application Data

[63] Continuation-in-part of Ser. No. 255,719, Oct. 13, 1988, abandoned.

[51] Int. Cl.$^5$ .............................................. B63B 7/00
[52] U.S. Cl. .................................... 114/39.1; 114/267
[58] Field of Search ..................... 114/61, 92, 97, 103, 114/123, 125, 267, 39.1, 102

[56] References Cited

U.S. PATENT DOCUMENTS

| | | | |
|---|---|---|---|
| 210,573 | 12/1878 | Spooner | 114/92 |
| 1,504,057 | 8/1924 | Koelkebeck | 114/103 |
| 3,846,858 | 11/1974 | Syfritt | 114/61 |
| 4,230,060 | 10/1980 | McCoy | 114/90 |
| 4,313,391 | 2/1982 | Hall | 114/90 |
| 4,341,177 | 7/1982 | Miyazaki | 114/125 |
| 4,562,786 | 1/1986 | Pruonto | 114/61 |
| 4,598,659 | 7/1986 | Chinnery | 114/123 |
| 4,612,868 | 9/1986 | Reynolds | 114/103 |
| 4,694,770 | 9/1987 | Kitner | 114/123 |
| 4,738,212 | 4/1988 | Schweitzer | 114/61 |

Primary Examiner—Joseph F. Peters, Jr.
Assistant Examiner—Clifford T. Bartz

[57] ABSTRACT

What has been created is the fastest sail boat that can act as a tugboat or industrially used to pull a water turbine for the production of electricity or compressed air, as compared to the capabilities of the prior arts of equal size and form. This is attained by the use of water as counterweight contained and locked-in inside an impervious pipe which may be of the same length as the boat, which is attached at the side or preferably under the hulls of a catamaran type boat, or which is attached to each lower side of a mono-hull boat;—by erecting as many large square sails as possible along the longitudinal axis of the boat in an arrangement to form an aggregate dwarf sail to bring down the centroid of the aggregate wind force close to the level of the boat to minimize the overturning moment of the wind upon the boat, thereby maximizing wind contact within the stability limits of the boat;—by making the hulls vertically thin to minimize resistance thru the water;—by adding a short float booster pipe on top of the main floater pipes, which extends beyond the front and rear ends of the hull to provide extra buoyancy on the sinking side when the boat is tilted too far.

6 Claims, 5 Drawing Sheets

KASIPAGAN SAIL BOAT

CROSS-REFERENCES TO RELATED APPLICATIONS:

This application is a Continuation-In-Part of previous Application No. 07/255,719 filed Oct. 13, 1988, (abandoned).

Applicant's rights to this subject invention is full and complete as there is no federal sponsorship on it.

BACKGROUND OF THE INVENTION

1. Technical Field:

This invention deals with a new method of constructing a sail boat to attain a maximum sailing speed at the least materials used. The boat is constructed to have maximum safety against overturning and to have maximum wind contact for every particular sizes of boats. The wind has been the best friend of man in moving cargo across the ocean. The energy offered by the wind is unlimited, but man has not really mastered this Genie specially during storms. This invention is a new design of a sail boat to make it able to produce the largest forward force that is perpendicular to the wind compared to the ability of existing designs of the same size of boat. This invention also pertains to a new design of sail form and arrangement such that the integrated centroid of the windforce upon the sails is nearest down to the level of the boat to reduce overturning moment to the minimum, giving the chance to maximize wind contact.

2. Description of the Prior Arts

The existing design of sail boat, whether the mono hull type or the catamaran type, has to be assisted with transferring counter-weights such as the operators and/or passengers who are alternately moving from one side to the other side of the boat in order to prevent overturning of the boat due to excessive overturning moment produced by the wind upon the sail and the overturning moment produced by the weight of the sail and the overturning moment by the weight of the mast when the boat is tilted to either side. The overturning moment effect upon the boat is directly proportional to the height of the center of gravity of the sail or the centroid of the wind force)above the boat.

Referring to U.S. Pat. No. 3,846,858 dated Nov. 12, 1974 by Syfritt—there is shown a variable hull boat (catamaran to trimaran or multihulled) in the form of two elongated collapsible/inflatable flexible container coupled together by a center framework that can be made into a center deep hull. This design has advantages on its convertability, including the detached uses of the flexible container, but taking it as a sail boat, it has the folloWing deficiencies:

1. It lacks side stability against overturning if the sail is made too large for its size when trying to maximize wind contact, or when trying to impede or deflect the maximum quantity of wind at a transverse cruise, there being no counter weight on either side.

2. The sail is a triangle tapering upward which moves the centroid of the wind force further upward from the boat, thereby increasing the overturning moment at least wind contact.

3. Extension pipes #26 is intended to hold the bow support #25 that is why it is too short forward, —which does not provide a structure to support additional separate sail erected far out beyond the front end of the boat.

Referring now to U.S. Pat. No. 4,341,177 dated July 27, 1982, by MIYAZAKI etal., —there is shown a small watercraft with a hull in the forward and rearward portions of its lower part, which has a water accommodation compartment on its lower front section and additional two water compartments on each side of the rear bottom section of the watercraft. Said water accommodation compartments are provided with side openings large enough to allow water to get in fast when watercraft gets to rest in order to bring down the center of gravity of the craft below the center of buoyancy to create floating stability. This special feature has great advantages-but it is only good for short time balancing process as the water accommodation compartments get empty very fast, and hence, the following deficiencies:

1. The counter balancing ability is only good for short time balancing process because the water accommodation compartments get empty when the load stays on one side for a long time beyond 3 seconds.

2. The counter balancing function of the said water compartments do not work when this watercraft is propelled by wind-sail because the left side compartment is emptied when the sail tilts the craft to the right side, and vice versa.

3. The objective of his invention does not include watercraft being tilted to one side for a long time.

Referring to U.S. Pat. No. 4,313,391 dated Feb. 2, 1982 by Hall, which shows a cross arm at the middle height of the mast for the purposed of stiffening the mast. But the purpose is defeated because of the following errors and or disadvantages:

1. It obstructs the maneuverability of the sail around the mast, and will even destroy the sail;

2. It stiffens the mast but one direction only;

3. It is a lot of complicated work at least benefit, because stiffening of the mast in all directions can be done by a horizontal circular spreader plate ring around the mast with 4 to 8 shrouds around the mast.

Referring to U.S. Pat. No. 210,573 dated Dec. 3, 1878 by W. H. Spooner, showing a square sail but built into a multilevel high sail which becomes an aggregate rectangle at an erect or vertical posture, resulting to a very high elevation of the centroid of the wind force that produce a very large overturning moment upon the boat.

Referring to U.S. Pat. No. 4,612,868 dated Sept. 23, 1986 by Reynolds—showing a vertically elongated triangular sail which is being expanded vertically by adding narrow horizontal segments to the bottom of the main body of the sail by means of a horizontal zipper as fabric connector—but it is in error because expansion of the sail creates additional lever-arm for a bigger overturning moment upon the boat. Zipper is a jointing method much older than Reynolds, but it is so far the best method in joining together pieces of fabrics specially in replacing an old sail and attaching a new sail to the existing frame of the sail.

Referring to U.S. Pat. No. 4,230,060 dated Oct. 28, 1980, by McCoy—showing a sail boat having a tall triangular sail which in effect moves up the centroid of the wind force thereby increasing the overturning moment upon the boat. The cross arm #20 likewise obstracts the free maneuver of the sail around the mast, it being too long, The function of cross arm 20 is already being done by side stay 112 & 114. The cross arm may even destroy the sail when the sail turns around the mast.

Referring to U.S. Pat. No. 1,504,057 dated Aug. 5, 1924 by KOELKEBECK—showing several designs of sails which, per FIG. 19, are several strips of fabric hanging from a heavy cross-arm forming a narrow horizontal sail —which the inventor intends to use in a small life boat. This method of constructing a sail has a good advantage because the wind force is close to the boat, that means minimizing the overturning moment upon the boat, but the following are the errors of this design:

1. It is a narrow rectangular sail which makes the wind spill over to the top and under the bottom of the sail thereby relaxing the development of effective wind pressure upon the sail. The principle is that the effective wind pressure approaches zero if the width of the sail approaches zero,—that is why the ideal shape of a sail should be a square.

2. The sail is an assembly of integrated individual narrow erect rectangular sail (not a solid sail) with spaces/gaps in between thereby actually forming a perforated sail allowing the escape of air thru it thereby missing out the development of effective wind pressure upon the sail.

3. This design is adoptable to small boats only, such as the life boat as per intention of the inventor, because if this design is constructed to a large size, the horizontal frame of the sail and the mast would become very massive/heavy and very expensive and most disadvantageously would contribute to the overturning of the boat.

Referring to U.S. Pat. No. 4,598,659 dated July 8, 1986, by Chinnery—showing a boat having a rigid flat side floater member #28. This feature is very disadvantageous to the sail boat because it contributes to the in-stability on the rough seas because it cannot slice through the surfs. It offers a wide broad face upon the in-coming waves so this boat will be oscillated vigorously by the surf.

Referring to U.S. Pat. No. 4,738,212 dated April 19, 1988, by Schveitzer—showing a slow motion water craft that is designed for use in underwater observations, which is a group of pantoon in triangular formation but there is no safeguard against oscillation by the surfs because it has broad bottom face that is pushed up and down vigorously by the surfs. In summary, all the aforesaid reference prior arts are slow sailers due to the following deficiencies, to wit:

1. The hulls are not built to be thin/narrow width relative to its height to enable the hull to slice—easily thru the surf, in order to minimize oscillation by the surfs;

2. The hulls are not built to have counter weights against overturning when the boat is tilted to either side by the sail.

3. The hulls are not built to have float boaster on each side to prevent the boat from sinking on the side where it is tilted when the wind acts too strong upon the sail.

4. The boats have not been built to hold four or more individually erected large square sails arranged longitudinally on the boat on the purpose to bring down close to the boat the centroid of the integral sum of the wind force from every sail while maximizing wind contact and wind pressure within the structural limits of the boat.

5. The sails are very tall, bringing up the location of the centroid of the wind force thereby creating a very large overturning moment upon the boat.

6. The masts are very heavy which contribute to the overturning moment upon the boat.

7. The stays and shrouds are very close to the mast, a situation that obstructs the free maneuver of the sail around the mast.

SUMMARY OF THE INvENTION

This invention aims to solve all the aforementioned problems and errors of the prior arts and to introduce new technology in sailing and in the construction of sail boats which is hereby clearly disclosed.

A. Objectives of the Invention

1. To create the fastest sailing boat compared to the speed of the prior arts of equivalent length of water line;

2. To create a counter balancing equipment that can be attached to any type of boat to effect a substantial improvement to the stability of the boat, which is in the form of water contained in a pipe (straight or curbed);

3. To create a sail boat with least oscillation when crossing the surfs, and with least resistance thru the water 4. To create a boat that can accommodate the erection of four or more sails at a good spacing along its longitudinal axis at minimum length of water line on the boat that gives the strongest pull upon a water turbine;

5. To create a sail that is most effective in developing wind pressure upon the sail.

6. To create a sail that is most effective in deflecting wind to the rear of the boat in order to develop more forward wind force;

7. To create a new sail arrangement that provides the maximum wind contact at a normal body proportion of boat, corresponding to the limits of stability of the boat to hold the sails upright, —this means maximum wind contact at minimum overturning effect.

B. HOW TO ATTAIN THE AFORESAID OBJECTIVES

1. By building the boat in the form of a catamaran type but the two hulls must each be in the form of a single vertical stack pile of impervious pipes to make the hull vertically thin as illustrated by parts 4 & 5;

2. By making the upper float pipe larger than the lower float pipe:

3. By providing a water-filled counter weight pipe attached below or beside the lower float pipe of each hull; in the form of a pipe filled up permanently with water while the boat is on the water but drained when the boat is being transported on land, which has the same length and size as the float pipe, as illustrated by parts #4;

4. By providing a large short float booster pipe attached to the top front end and to the top rear end of each hull, which does not touch the water in ordinary sailing but will guard against overturning during rough sailing, which extends well and overhanging forward beyond the front end of the main float pipe, and likewise do the same with the rear float booster pipe overhanging backward behind the rear end of the main float pipe, but there should be no booster pipe on the middle half of the boat to minimize oscillation when crossing the surfs, as illustrated by part #3:

5. By maximizing wind contact corresponding to the stability limits of the boat, which is attained by erecting many large independent sails along the longitudinal axis of the boat, which is in effect a new arrangement of horizontal expansion of the sail (instead of vertical expansion)/ thereby the center of the wind forces will be acting at lowest level close to the boat's level, as shown in the drawing by part #1 having individualized mast each sail;

6. By making the sails in the form of a square face and made concave to the wind, as illustrated by part #1 in the drawings;

7. By providing a deflector vertical flap wing attached vertically at the rear side of the sail to effect rear-ward ejection of air to produce a stronger forward dynamic forCe upon the sail, as illustrated by part #7 in the drawing;

8. By providing a forward structure beyond the front end of the boat but above the water to accommodate an extra front sail and to accommodate the far front guy rope, as illustrated by parts #2 & 3 in the drawing;

9. By providing a rear-ward structure far back behind the rear end of the boat to accommodate an extra sail erected at the rear and an extra guy rope tied to the far—rear, as illustrated by parts #2 & 3 in the drawings.

10. By providing a cross arm (sideward, forward & rearward) at the top of each mast above the sail to make the guy ropes stay far away from the mast to provide a wide space for the large square sail to revolve/maneuve freely around the mast, as illustrated by part #6.

11. By providing a sail mast connector ring bearing attached around the mast to carry and to hold the sail up the mast and to allow the sail revolve freely around the mast.

12. By making the mast; the cross-arms, and the sail frames as light as possible to reduce structural weight above the boat to minimize overturning effect due to overhead weight—by using guy ropes for the mast and lift ropes for the sails, and pipes for the masts;

13. By turning the boat along the current of the wind (instead of turning against the wind) when changing to a new direction of cruise.

C. Advantages of the New Technology Created

1. The new idea in this invention for using water to serve as counter weight in sail boats is a new break-thru because the weight of water becomes zero when submerged in water, which, in effect, the pipe permanently filled up with water that is attached at the bottom of each hull does not pull down the hull at the sinking side of the boat because its weight disappears in water, but the water-filled pipe counter weight attached to the bottom of the hull at the rising side of the boat pulls down the rising hull back to the water with full force equal to the total weight of the water contained in said counter-weight pipe that is brought out above the water—but stops pulling down the hull the moment it returns to the water, hence, the stability of the boat against overturning is very much improved without the help of the passengers alternately transferring their weight to each side of the boat.

2. The new idea of a single stack pile of pipes to serve as hull for a boat is a new break-thru because:
    (a) It is least oscillated by the surfs, it acts like a thin blade that can slice easily thru the water waves;
    (b) It has the least resistance in cruising thru the water;
    (c) It acts like a wide faced wall that offers maximum sideward resistance thru the water, which functions to prevent the boat from being drifted sideward by the wind when cruising transverse to the wind.

3. The use of the float booster pipe, which, upon touching the water, boosts the stability of the boat against overturning. Its effect is that the sinking side of the boat will stop sinking because the floating power of said booster pipes comes into effect when the boat tilts too far, at the same time the wind force upon the sail becomes less, and at the same time the counter-weight effect of the water-filled counter-weight pipes becomes maximum as the pipes at the rising side of the boat all come out of the water.

4. The new concept of maximum wind contact of the sail to match the maximum stability of the boat by keeping down the center of the wind force close to the level of the boat, which is attained by horizontal expansion of the sail (instead of making the sail very tall) thru erection of many large individual square sails to an extent beyond the ends of the boat, is also a break-thru in fast sailing technology. Making the Lever-Arm of the Wind Force as short as possible (meaning the wind is acting at lowest level), makes the least overturning effect, because overturning moment is directly proportional to the vertical distance (lever arm) of the wind force from the level of the boat.

5. The new concept of providing a deflection wing that is connected at the rear of the sail, makes the sail more concave to the wind, increasing the ability of the sail to expel the wind to the rear thereby creating a larger forward dynamic force upon the boat.

6. The new concept of erecting an additional extra mast beyond the front end and beyond the rear end of the boat, which is attained thru the construction of structural extensions above the water and beyond the front end and rear end of the boat, enables the boat to accommodate additional large sail at the front and at the rear for the purpose of horizontal expansion of the sail.

7. The new concept of making the sail able to revolve around the mast when making a turn, enables the sail stay concave to the wind by keeping the sail away from the mast which is achieved by turning the boat around along the current of the wind, so the wind will not press the sail against the mast.

8. The new concept of placing the cross-arms to the top of the mast well above the upper frame of the sail for the purpose of pushing out the guy ropes away from the mast in order to create a wide space for the sail to revolve freely around the mast, increases the maneuverability of the sail.

9. The new concept of inter-guying all the mast at the top by one single line of the rope along the longitudinal axis of the boat, is a new method of creating wide clear space around the mast to accommodate the sail, at the same time a way to keep the mast rigidly erected all together by one Guy rope. This method of adequate guying allows the masts to be constructed out of light pipe poles, instead of heavy solid poles.

10. The new concept of using the sail boat to pull a water turbine to produce electricity, compressed air, and hydrogen gas fuel is a new form of a windmill which creates a new industrial used for the sail boat. Several water turbines may be attached along the longitudinal axis of the Kasipagan Sail Boat (in between its hulls) to maximize convertion of the wind energy contacted by the sails. When pulling the turbines, the boat should be traveling slowly in order to develop high wind pressure upon the sails, for higher convertion efficiency.

D. Uses of the New Technology Created

Figure 5:
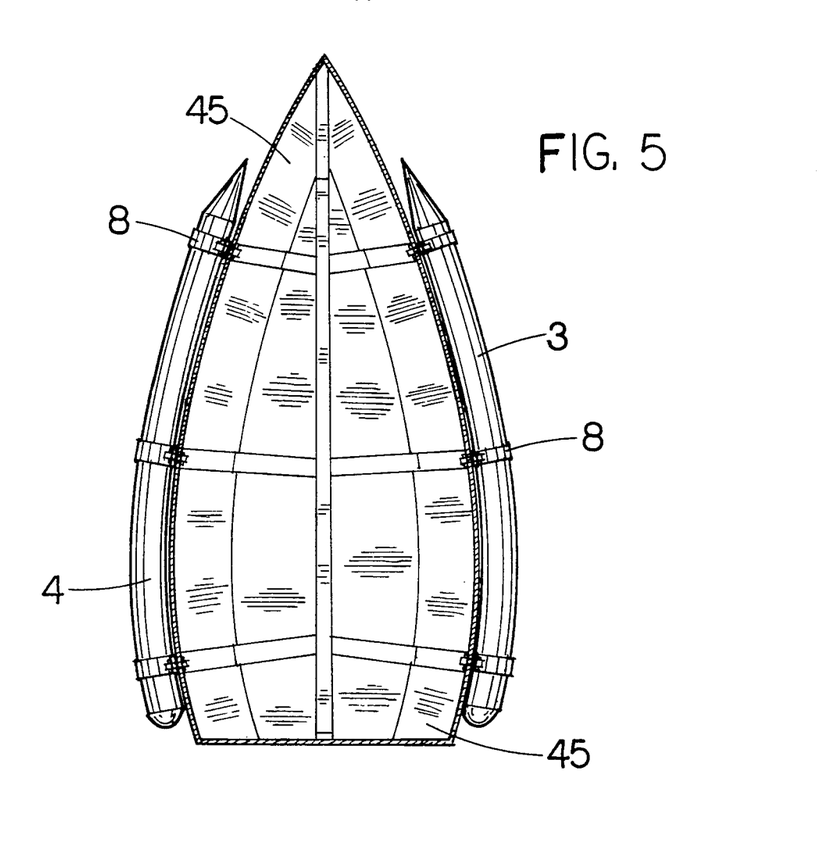
FIG. 5 illustrates the construction of a curved counterweight pipe (4), and of a curved float booster pipe (5) that are attached to the sides of an ordinary mono-hull boat, in order to improve its stability.
Figure 6:
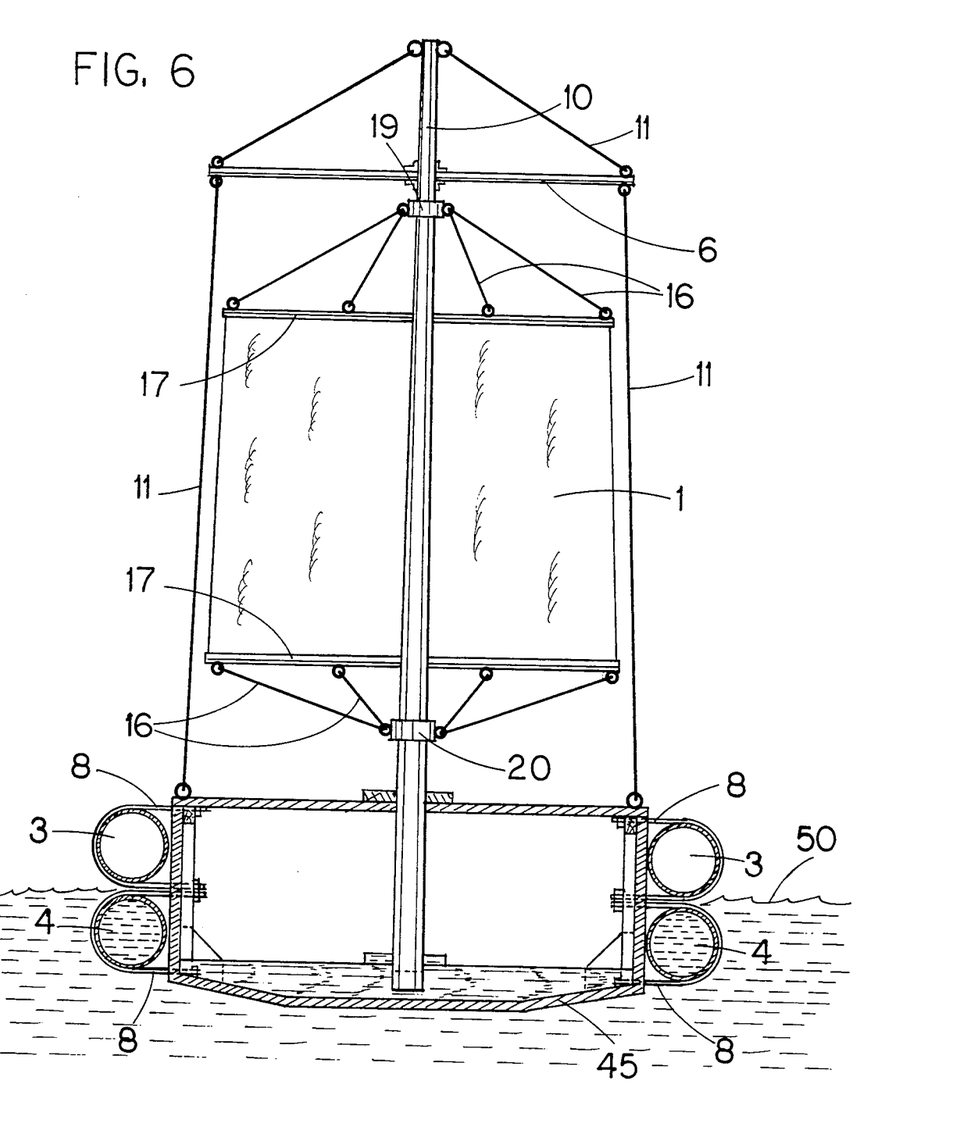
FIG. 6 illustrates the installation of the counterweight pipe (4) and the float booster (5) to the sides of a mono-hull boat at a sectional view. It also illustrates the installation of a sail wherein the upper and the lower frames (17) of the sail are not attached to the mast (10).

1. The counter weight #4 and the float booster pipe #3 are not limited to usage in the catamaran type of boat, but they may also be used to improve the stability of the monohull and the tri-maran boat, as shown in FIG. 5 and FIG. 6.

2. Erection of many square dwarf sails may also be done on the monohull and the tri-maran boats.

3. The name "Kasipagan Sail boat" is not limited to the catamaran type, but also applicable to the monohull and to the tri-maran type of boats at the moment they adap and use the counter weight #4, the float booster #5, and the plurality of dwarf square sails, 4. The Kasipagan Sail Boat may be used as tugboat in the "United Sail Windmill", FIG. 7, U.S. Pat. No. 4,859,146, or may be used to pull water-turbines for the production of compressed air and electricity to produce hydrogen and oxygen by electrolysis of sea water.

5. The Kasipagan Sail Boat may be constructed as a small sports boat that can be dismantled and be stored in the garage instead of being left parked elsewhere, since the hulls are just made of plastic pipes.

Before proceeding any further, it should be noted that the Water-Tank Pipe Counter Weight and the Float Booster Pipe are not limited to be used in the Kasipagan Sail Boat, but are also adoptable for use to improve stability of the Mono-Hull boats, and for other multi-hull boats, as illustrated by FIG. 5 and FIG. 6.

DESCRIPTION OF THE PREFERRED EMBODIMENTS

Figure 1:
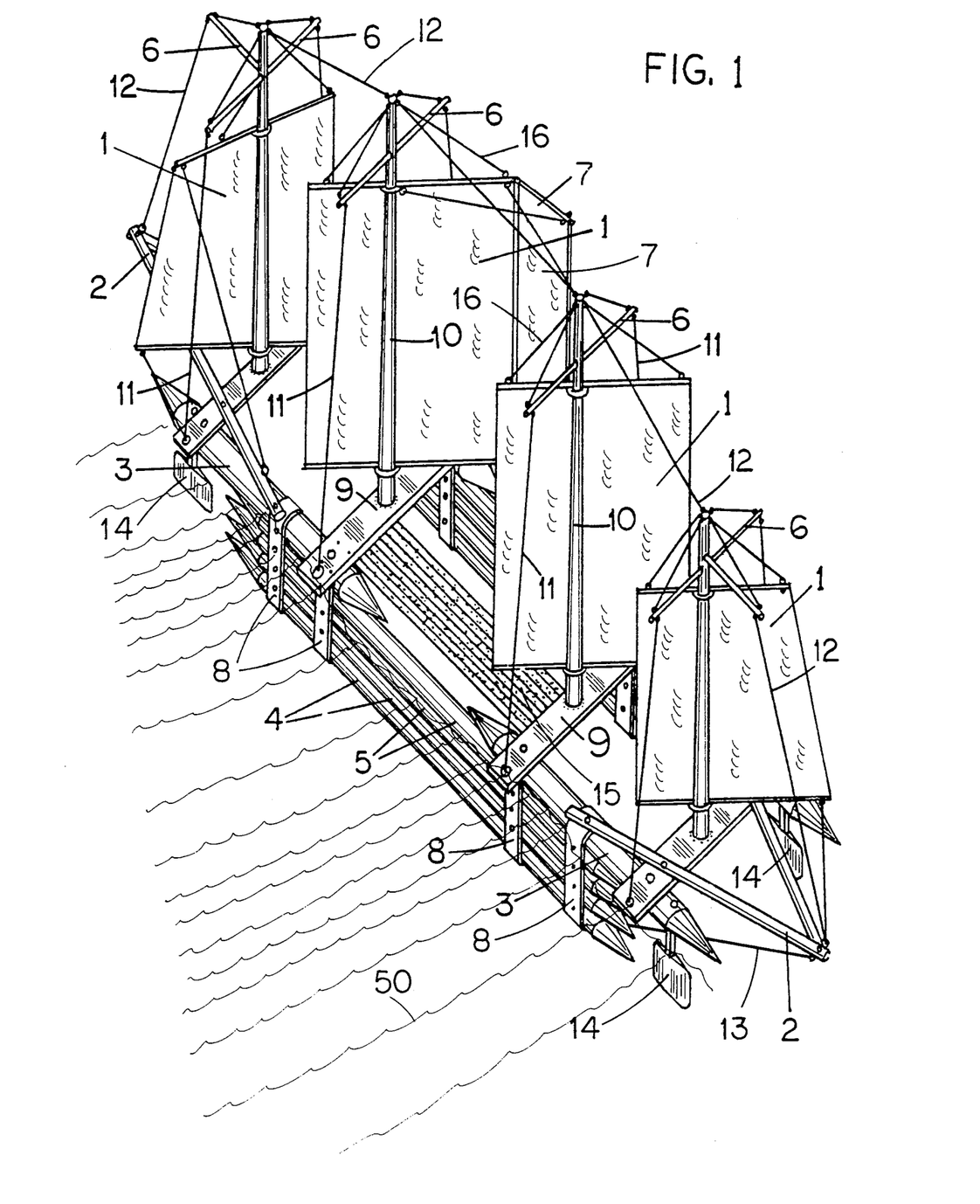
FIG. 1 illustrates a schematic perspective view of a high speed sail boat that has Four (4) or more sails and a counter weight Part #4 at the bottom.

As per objectives of this invention, this sail boat has to be of the catamaran type to have the highest stability against overturning, as shown in FIG. 1. To make the hull more slippery or less resistant thru the water it must be built in the form of a thin horizontally floating wall with its wider face vertical such as the one illustrated by part #4,& #5 which is a vertical stack pile of float pipes, so that it will be cutting freely thru the water like that of a thin blade. To make the hull much more stable against overturning, without the need of the passengers to transfer weight from one side of the boat to the other side, the counterweight parts #4, which are impervious pipes permanently filled up with water (water tanks), are attached below the float pipes #5. The Said Counter weight #4 must not release its water content when lifted up above the water so that the downward force equal to the total weight of the water content will pull down the lifted float pipe #5 back to the water thereby putting back the boat to an erect posture.

It should be noted at this point that the weight of the counter weight #4 becomes zero (0) when submerged in water beCause its content is water, thereby the counter weight #4 at the sinking side of the boat do not act to pull down or do not further sink—the float pipes #5 at the side where the boat is tilted down by the sail.

Further, to provide more ability of the boat to counter balance against overturning the float booster pipe #3 is added on top of the main float pipe #5 to keep the boat able to totally float on one side only when it is tilted too far. This float booster pipe also serves as footing for the end sail #1 that is erected far beyond the front and the rear ends of the boat.

It should be noted at this point that the overturning moment upon the boat is equal to the total force (in pounds) of the wind upon the sails, multiplied by its lever arm, —the vertical distance (in feet) of the wind force from the level of the main float pipe #5 at the sinking side of the boat. It follows therefor that to minimize the overturning effect of the wind upon the boat at maximum wind contact, it is but logical to bring down the center of the individual sails close to the level of the boat. To attain this objective, the supposed very tall sail #1 is chapped down into four or more pieces and re-erected at a horizontal expansion arrangement —along the longitudinal axis of the boat, to maximize wind contact using dwarf sails #1, but at—the least overturning effect upon the boat.

It should be noted at this point that the development of wind pressure upon the sail approaches zero as the width of the sail approaches zero—which means to say that the sail should approach the form of a square face and made as wide as possible to maximize its ability to develop large wind force, that is why in this invention the sails are in the form of a large square face, as shown in the drawings, to maximize wind contact and wind pressure.

To provide a wide free space around the mast thereby allowing the large sail able to revolve around the mast, when the boat makes a turn, the guy ropes must be pushed away from the mast to a distance beyond the width of the sail by means of a cross-arm #6 at the top of the mast made of light pipes but strong enough in compression to act as strut or as a boom.

It is important to note at this point that the fabric of the sail should not be allowed to be touching or leaning upon the mast when sailing transverse to wind because the sail will be prevented from being fully concave to the wind. To make the sail form a large one piece fully concaved sail in any direction of cruise, the sail must be made to revolve around the front side of the mast always by turning the boat around along the current of the wind every time the boat turns back or in transferring direction from either side of the wind when sailing against the wind. With this procedure, the boat can turn without hoisting down the sail and then up on the other side of the boat.

In order to provide a forward anchor point for the guy supporting the first mast at the far front and likewise to support the last mast at the far rear, the extension structures #2, at the front end and at the rear end of the boat, are constructed well above the water which may be made as light as possible out of pipe materials that can float on water.

In order to add more ability for the sails to produce more forward dynamic force upon the boat out of the wind; the deflector flap wing #7, in the form of vertical rectangle is added at the rear and front end of the sail by means of a zipper #41 as connector for the fabric joint and by connecting its upper and lower frames by free pin or hinge connector #43 to the end of the upper and the lower frames of the main sail, respectively, to allow said wing to flip open and flip closed as blown by the wind. Said flap wing is provided with rigid pipe frame 39 around its sides to serve as tie bar to hold the control ropes #26 when said flap wing is active against the wind, and to serve as stiffener for its rear edge. Said control ropes #26 are tied to several points along the vertical length of said rigid pipe frame to form a "Y" sling and tied by pulley to the top and to the bottom of the preceding mast. Another flap wing may be attached to the front end of the sail to serve the same purpose as the front end of the sail becomes rear end when the boat turns around to the opposite direction. Said flap is automatically closed by the wind when it is at the front and automatically opens when it is at the rear end.

By following the logic of constructing the hulls of the boat and by observing the drawing after attaching the counter weight pipes #4 below the main float pipes #5, it comes out that the hull becomes a vertical wide wall under water, which acts as a solid resistor against sideward drifting thru the water when sailing transverse to the wind.

Figure 4:
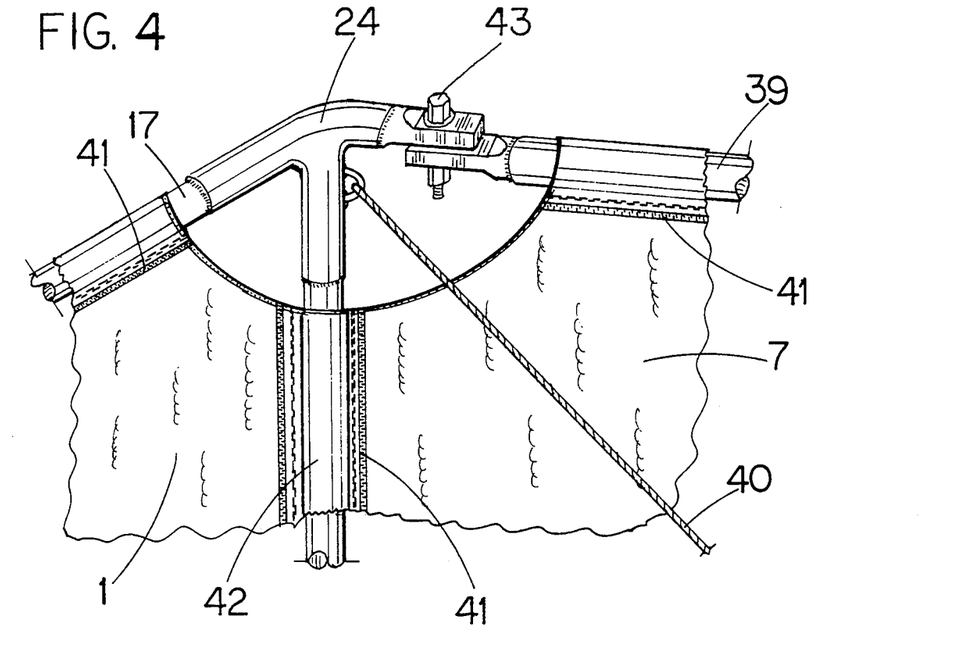
FIG. 4 illustrates the construction joint of a flap-deflection wing of the sail and a diagonal rope brace (40) to keep said wing stand squarely. It also illustrates the provision of a zipper joint (41) to ease installation of the fabrics on and off the frames.

The upper frame of the sail may be suspended up to the mast by means of suspension ropes #16 that are connected to several points along the length of said frame #17 to prevent excessive bending of said frame. Said suspension ropes #16 are all connected to a central bearing #19 that is fixed just below the cross-arm #6 and which is free to revolve around the mast, and the same procedure is done with the lower frame 17 that is attached by several ropes to the bearing #20, thereby allowing the sail #1 to revolve around the mast freely without being interferred by the cross-arm 6. Said bearing #20 is free to move up and down the mast to allow the sail #1 that has no side frame to be rolled up the mast when not in use. The sail #1 that has side frames #42 can also be rolled up the mast by by disconnecting the side vertical frames #42 from the lower horiframes #17 and by disconnecting the vertical zipper joints #41 of the fabrics as shown in FIG. 4. A grid of strings may be provided at the back of the fabric sail in order to make it strong against the wind of higher velocity specially when the boat is being used to pull water turbines.

Figure 3:
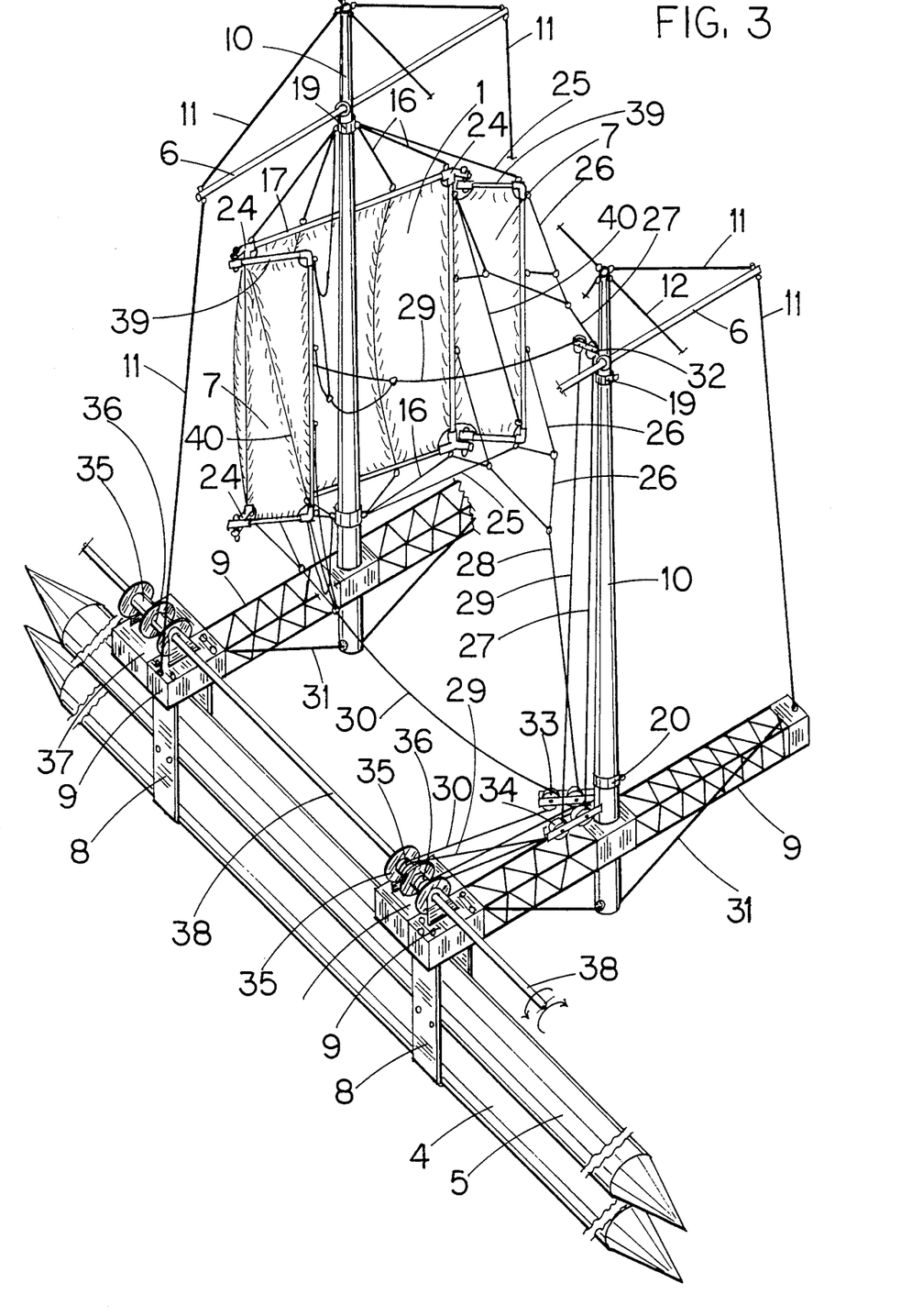
FIG. 3 illustrates the construction of a sail having side flap-deflection wings (part 7). It also illustrates the construction of a central control winch (35) that enables a one-man operator to control several sails at the same time.

As illustrated in FIG.3, the winch 35 and 36,having common circular wall at the middle, are locked together to a drive shaft 38 which is a common shaft that drives all the other winches from the front to the rear of the boat all at the same time in one unison rotation which in turn move the sails #1 in a uniform movement to the left or to the right by the control ropes 27, 28, 29, & 30 that passed thru the control pulleys 32, 33, & 34. It should be noted at this point that the upper and the lower control ropes 29 & 30 holding the left side of the sail #1 are wound over the winch 35, while the upper and the lower control ropes 27 & 28 holding the right side of the sail #1 are wound under the winch 36, thereby releasing the left side of the sail #1 while winch 36 tightens the hold on the right side to the sail #1 when the drive shaft 38 is turned clockwise.

Figure 2:
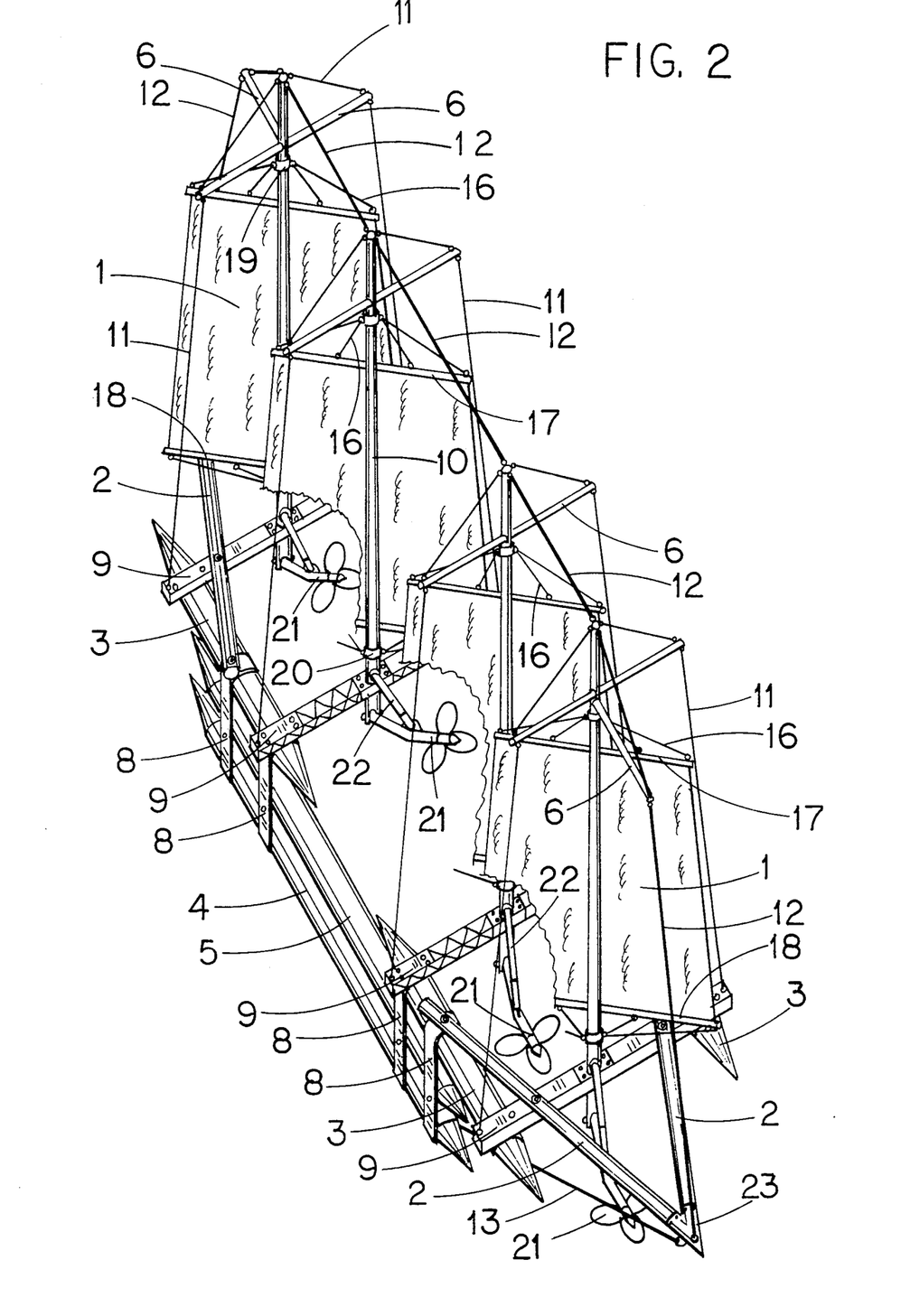
FIG. 2 illustrates a schematic perspective view of a Kasipagan Sail Boat being harnessed to industry by attaching several Water-Turbines along the longitudinal axis of the boat.

It can be observed also from FIG.3 that the structural beam #9 may be constructed into a long span (100 feet or more) truss bridge which is provided with a high tension bar #31 to exert an up-lift force upon the bottom of the mast 10 and to make said truss bridge carry large load. This situation happens when it is desired to make the sails very wide for the purpose of making the boat able to pull large water-turbines in the ocean as illustrated by Part #21 in FIG.2. Part 22 is a telescopic strut that is operated by compressed air or hydraulic oil to lift the water turbine 21 out of the water and tO move dOWn the turbine back into the water. The said turbine is then made to drive a compressor or an electric generator to produce electricity which in turn produce hydrogen gas by electrolysis of water. Hydrogen is then used to produce alcohol or gasoline. The float pipe #5, #3 & #2 in FIG.2 may be made of stainless steel to serve as storage tanks for the hydrogen gas that is produced in the process.

Referring back to FIG.1, in order to make the hulls into a vertical stack single pile of pipes, the float booster pipe #3 and the main float pipe #5 and the watertank pipe #4 are bundled all together to act as one whole piece by means of a vertical flat "U"-Bar #8—the upper end of which is bolted upward thru and at right angle with the horizontal structure tie beam #9 which in turn is rigid enough to hold at its ends the two hulls together at squarely parallel to each other. The structural tie beam #9 also acts as strong footing for the masts #10 at the same time also acts as bridge to carry the floors of the boat. Said beam #9 may be made of round log timber, rectangular timber, or rectangular built up pipe beam, or in the form of a truss bridge that is made of pipes in case the boat is constructed into an ocean going vessel, to make said beam as light as possible. The mast #10 may be made of round pipes (of such materials as bamboo, plastic, aluminum, steel, or built-up timber pipe pole) that is tapering to the top to make it as light as possible, the bottom of which is bolted down thru the center of said beam at an erect posture The Guy Ropes #11 and #12 are used to hold the masts to make it stand at an erect posture rigidly against the forces of the wind upon the sail. The Guy Rope #13 is used to hold down the tie point structure #2 at the far front and at the far rear against the uplift force of of the longitudinal guy rope #12, by tieing said tie point down to the lower section of the hulls. The Rudder #14 may be connected to both ends (front and rear) of each hull in order to steer the boat more efficiently and to make the boat able to sail back and forth without turning around (meaning either end of the boat may be used as front end and that either rudder may be made neutral).

The triangular structure tie point #2 is fastened to the top of the Booster Pipe #3 and on to the top of Tie-Beam Structure #9 by means of water-tight bolts or by means of metal strapped around said pipes in order to avoid boring a hole on said pipes, to prevent water getting into said pipes. The flooring of said boat may be made of net at the 3rd end areas, and of lumber boards or of metal sheets at the middle 3rd area. A weatherproof cabin may be constructed at the center of the boat for the confort of the passengers.

Said triangular tie point structure #2, being in a triangle form, also serves as a rigid structure to hold the two parallel hulls to stay squarely with the tie beam structure #9 and prevents the formation of a parallelogram.

For low cost construction of small boats, the hulls may be made of bamboo poles bundled together and the lower bamboo poles can be filled up with water to serve as part #∝ (counter weight).

It should be noted further at this point that the counter weight pipe #4 is not limited to being filled up with water, but instead, it can be more advantageously filled up with selected solid materials that are lighter than water such that when placed on water, Part #4 will float alone by 10%, —such solid materials may be a mixture of plastic granules, empty pipes, and small pieces of dry wood. In this way, the counter weight #4 is actually a calibrated weight which can be manufactured as a separate item being sold in the market.

Referring to FIG.4, it is shown that the frame 39 of the flap wing 7 is connected to the main sail frame 17 thru a three prong connector 24 by means of a free pin bolt 43 to allow frame 39 to move horizontally freely but not vertically as prevented by the diagonal tension rope 40. Said pin bolt 43 may be replaced by a universal cross jount to allow frame 39 to collapse downward when not in use and to prevent possible breakage at the joint when rope 40 is broken.

Referring to FIG. 5, there is shown a curved counter weight pipe #4 and a curved float booster pipe #3 which are manufactured as separate items to be sold in the market and to be installed to the sides of existing monohull boats to improve stability.

Referring to FIG. 6, there is shown a sectional view of the counter weight pipe #4 showing its water content and which is installed at the lower side of a monohull boat such that it is just below the water surface 50 when the boat is on erect posture on still water. There is also shown a section of float booster pipe #3 installed at both sides of the monohull boat immediately above the water surface 50 when said boat is erect on still water. The purpose of which is to make it act immediately when the the boat tilts a few degrees by floating the sinking side while counter weight pipe #4 pulls down the rising side of the boat.

What I claim for which protection by a patent is applied for, are defined as follows:

1. A new structural design for a sail boat, comprising:
   guy ropes, and a plurality of masts;
   said boat having a plurality of hulls, each hull being comprised of a plurality of long impervious pipes which are stacked in a single vertical plane forming a hull structure, the upper pipe being a main floater pipe and the lower pipe serving as a counterweight;
   said counter-weight being in the form of a water-tank that is calibrated to float by 5% to 10%, and which may be of the same size and length as the main floater pipe;
   a short float pipe which is larger in diameter than the main floater pipe, and which is horizontally disposed on the top end of each main floater pipe, and extended forward and rearward beyond the main floater pipe above the water line, to serve as a float booster;
   a plurality of structural tie points for the guy ropes, one each beyond the front and the rear of the boat, which tie points consist of a structural pipe member that is horizontally disposed on top of said float booster and which is extended beyond the outer ends of said float booster to form a triangular structure beyond the ends of the hull structure;
   struts to push out the guy ropes away from the masts and clear off the sails, said struts being in the form of a horizontal cross-arm structural pipe that is disposed along each guy rope and is at least five feet below the top end of each mast, the length of said struts being coextensive with the top width of the sail;
   a plurality of independently erected large square sails, each said square sail being made out of a light strong fabric with a rigid frame at the top and at the bottom, each sail being erected along the longitudinal axis of the boat such that at least one sail is erected beyond the front end of the hull structure and another sail is erected behind the rear end of the hull structure providing a horizontal expansion of the sails along the length of the boat;
   a grid of strings or straps provided at the back face of each sail to reinforce the strength of said fabric against the excessive pressure of the high speed winds;
   a means to further deflect the wind to develop more wind pressure and a larger forward dynamic force upon the sails, said means being in the form of a plurality of vertical flap wing deflectors made of framed fabrics, said fabrics attached to each side of the square sails by a zipper;
   said deflectors being framed at the top, bottom, and rear sides by a rigid pipe which serves as a stiffener to the vertical sides of the square sail, the front ends of the deflector frames being securely connected to the ends of the square sail frames by means of a hinge connector to allow said deflector to flip open or closed;
   a means to hold said deflector at a fixed angle with respect to the main sail, said holding means being a rope one end of which is tied to the rear end of the upper and lower frames of said deflector and the other end of which is tied to a point near the mast;
   a flat "U-Bar," vertically disposed, to assemble the water-tank pipe, the main floater pipe, and the float booster pipe together in a single vertical plane to act in a unitary fashion so as to serve as the hull for said boat;
   said "U-Bar" being bolted upward thru and at right-angles with respect to a horizontally disposed structural beam to hold said hull in a single vertical plane;
   said structural beam, which may be made of a rectangular box pipe, being disposed perpendicular to the hulls with at least two beams interconnecting the hulls and holding the hulls parallel to each other;
   a mast to hold upright each sail, each mast being erected on the mid-section of each of the said structural beams, said masts being made of pipes which taper to the top;
   a plurality of guy ropes tied to the top of each mast, and thru the outer tip of each cross-arm, and tied down to the outer tip of said structural beam, to hold the masts rigidly vertical;
   a longitudinal guy rope which holds together all the masts so as to stand rigidly vertical, said longitudinal guy rope being tied to the said structural tie point at the front of the boat, then proceeding up to a forward cross-arm and then to the top of a first mast, to the top of a second mast, to the top of a third mast, to the top of a fourth mast, to a rearward cross-arm,
and ending tied down to the said structural tie point at the rear end of the boat;
a control rope attached to several points along the frames of the sail;
an upper ring bearing connector, disposed at the upper section of each said mast, thru which the upper frame of each sail is attached to the mast, which bearing carries the whole weight of said sail thru a plurality of suspension ropes, and which bearing is a means to allow the sail to revolve around said mast;
a lower ring bearing connector, disposed at the lower section of said mast, thru which the lower horizontal frame of said sail is attached to the lower section of the mast thru a plurality of control ropes spacedly tied to said horizontal lower frame of the sail, which bearing being a simple loose ring that can freely move up and down the mast when the sail is being folded up or unfolded down, and which also serves as a means to allow the sail to revolve around said mast;
rudders disposed at both ends of the boat to steer the boat in either direction, since the boat may use its rear end as its front end thereby permitting it to reverse direction without turning around;
a linking rope one end of which is tied to the outer tip of each said structural tie point at the ends of the boat, and the other end which is tied down to the bottom end of each hull structure;
a floor fastened to the lower face of said structural beams;
a water-turbine attached to the bottom end of each mast, which turbine is capable of being moved in and out of the water, which turbine is driven by running water under the boat, and
a central control winch installed at both the right and left end of each said structural beam, said winch being made of a double drum, said drums being interlocked and driven by a continuous drive shaft starting at the rear end of the boat and extending all the way to the front end of the boat, such that one drum releases the control rope at the left side of the sail at the same time the other drum tightens the control rope at the right side of the sail when said drive shaft is turned clockwise, in order that a single operator can control all the sails simultaneously.

2. A boat in accordance with claim 1—wherein said counter weight is attached to the lower sides of a monohull boat, or to the sides of a trimaran boat, by curving said weight according to the curvature of the sides of said monohull boat, to boost stability.

3. A boat in accordance with claim 1—wherein said float booster pipe is attached to the sides of a monohull boat just above the water line when the boat is upright on still waters, by curving said float pipe in accordance with the curvature of said boat, to boost its stability.

4. A boat in accordance with claim 1—wherein said boat is used to pull water turbines by attaching said turbines between the hulls, or attaching said turbines at the sides of a monohull boat.

5. A boat in accordance with claim 1—wherein said boat is used as a tugboat for transferring materials.

6. A boat in accordance with claim 1—wherein said sails revolve around the front side of the mast thereby making the sails always fully blown up concave to the wind, avoiding the sails being pressed up against the masts.

* * * * *